（12） United States Patent
Hines et al.

(10) Patent No.: US 9,603,398 B2
(45) Date of Patent: Mar. 28, 2017

(54) GARMENT HAVING EXTENSIBLE SLEEVES

(71) Applicant: DRIFIRE, LLC, Columbus, GA (US)

(72) Inventors: Robert Winfred Hines, Columbus, GA (US); James Jonathan Bailey, Forston, GA (US); Irina Byalaya, Niles, IL (US)

(73) Assignee: DRIFIRE LLC, Chicago, IL (US)

( * ) Notice: Subject to any disclaimer, the term of this patent is extended or adjusted under 35 U.S.C. 154(b) by 0 days.

(21) Appl. No.: 14/912,567

(22) PCT Filed: Aug. 27, 2014

(86) PCT No.: PCT/US2014/052918
§ 371 (c)(1),
(2) Date: Feb. 17, 2016

(87) PCT Pub. No.: WO2015/034722
PCT Pub. Date: Mar. 12, 2015

(65) Prior Publication Data
US 2016/0198778 A1   Jul. 14, 2016

Related U.S. Application Data

(60) Provisional application No. 61/874,353, filed on Sep. 5, 2013.

(51) Int. Cl.
*A41D 3/00* (2006.01)
*A41D 15/00* (2006.01)
(Continued)

(52) U.S. Cl.
CPC ............ *A41D 15/002* (2013.01); *A41D 1/02* (2013.01); *A41D 3/00* (2013.01); *A41D 27/10* (2013.01);
(Continued)

(58) Field of Classification Search
CPC .............................. A41D 15/002; A41D 27/10
See application file for complete search history.

(56) References Cited

U.S. PATENT DOCUMENTS 601,489 A * 3/1898 Tim ........................ A41D 27/28
2/115
1,679,206 A * 7/1928 Crossingham ........... A41B 9/08
2/113
(Continued)

FOREIGN PATENT DOCUMENTS

CN 202160674 U 3/2012
WO WO-2013/106332 A1 7/2013
WO PCT/US2014/052918 8/2014

OTHER PUBLICATIONS

U.S. Appl. No. 61/874,353, filed Sep. 5, 2013, Hines (DriFire, LLC).
(Continued)

*Primary Examiner* — Richale Quinn
(74) *Attorney, Agent, or Firm* — Ballard Spahr LLP

(57) ABSTRACT

A garment, such as a jacket, having extensible sleeves, is described. The garment has an outer layer comprising a torso portion having two armholes, two sleeve portions, and an optional collar portion. An action back configuration enables the sleeves to extend. An action back has a flange of material at least partially tucked within each of the armholes. An elastic connector couples the two flanges and extends across the back portion of the garment. When a person reaches forward the flanges extend to provide additional material for the extension of the sleeve. In addition, the two sleeves are configured with a gusset having two substantially linear sides connected to the sleeve and a curvilinear side coupled to the armhole. The gusset may have a cut to allow the gusset
(Continued)

to stretch. The sleeves comprise a cuff having a thumbhole for maintaining the cuff over the thumb of a wearer.

17 Claims, 15 Drawing Sheets

(51) Int. Cl.
  *C08K 5/07* (2006.01)
  *C08K 3/00* (2006.01)
  *C08K 3/40* (2006.01)
  *C08K 5/00* (2006.01)
  *A41D 27/10* (2006.01)
  *A41D 1/02* (2006.01)

(52) U.S. Cl.
  CPC .............. *C08K 3/0033* (2013.01); *C08K 3/40* (2013.01); *C08K 5/0091* (2013.01); *C08K 5/07* (2013.01)

(56) References Cited

U.S. PATENT DOCUMENTS

| | | | | |
|---|---|---|---|---|
| 1,949,312 A * | 2/1934 | Konski | A41B 1/00 2/122 |
| 2,114,514 A * | 4/1938 | York | A41D 27/28 2/93 |
| 2,279,761 A * | 4/1942 | Schatten | A41D 27/10 2/93 |
| 2,305,406 A * | 12/1942 | Clyne | A41D 27/10 2/115 |
| 2,312,777 A * | 3/1943 | Sholder | A41D 1/18 2/108 |
| 2,314,226 A * | 3/1943 | Lee | A41D 13/00 2/115 |
| 2,343,103 A * | 2/1944 | White | A41D 27/10 2/115 |
| 2,361,380 A * | 10/1944 | Callahan | A41D 3/04 2/87 |
| 2,447,989 A * | 8/1948 | Previdi | A41D 27/10 2/125 |
| 2,466,887 A * | 4/1949 | Berger | A41D 27/10 2/106 |
| 2,803,014 A * | 8/1957 | Beach | A41D 27/10 2/105 |
| 2,836,826 A * | 6/1958 | Geiss | A41D 27/10 2/125 |
| 2,839,756 A * | 6/1958 | Geiss | A41D 27/10 2/125 |
| 2,941,210 A * | 6/1960 | Bren | A41D 27/10 2/115 |
| 2,986,740 A * | 6/1961 | Schudson | A41D 27/10 2/115 |
| 3,013,276 A * | 12/1961 | Maxwell | A41D 27/10 2/115 |
| 3,037,210 A * | 6/1962 | Neuman | A41D 27/10 2/125 |
| 3,078,699 A * | 2/1963 | Huntley | A41D 1/04 2/115 |
| 3,137,860 A * | 6/1964 | Bindler | A41D 27/10 2/115 |
| 4,698,849 A * | 10/1987 | Mitchell | A41D 13/0015 2/115 |
| 5,410,758 A * | 5/1995 | Dupont | A41D 13/1209 2/247 |
| 5,884,332 A * | 3/1999 | Snedeker | A62B 17/003 2/227 |
| 7,356,851 B2 * | 4/2008 | Spruill | A41D 1/04 2/53 |
| D627,950 S | 11/2010 | Carpentier | |
| 7,937,771 B2 * | 5/2011 | Mazzarolo | A41D 13/02 2/456 |
| 7,941,871 B1 | 5/2011 | Jorgensen | |
| 9,259,036 B2 * | 2/2016 | Burmeister | A41B 1/08 |
| 2003/0051286 A1 * | 3/2003 | Gregg | A41D 27/10 2/93 |
| 2004/0237169 A1 | 12/2004 | Wood et al. | |
| 2005/0166298 A1 * | 8/2005 | Pieroranzio | A41D 1/06 2/69 |
| 2006/0048263 A1 * | 3/2006 | Walsh | A41D 27/10 2/69 |
| 2007/0028351 A1 * | 2/2007 | Coolik | A41D 27/10 2/115 |
| 2007/0079419 A1 * | 4/2007 | Spruill | A41D 1/04 2/69 |

OTHER PUBLICATIONS

Innotex, Inc., High Quality Turnout Gear, Product Catalog (2012) (17 pages).
International Search Report and Written Opinion of the International Searching Authority issued on Dec. 1, 2014 for international application PCT/US2014/052918, filed on Aug. 27, 2014 and published as WO 2015/034722 on Mar. 12, 2015 (Applicant—DriFire, LLC//Inventor—Robert W. Hines, et al.) (9 pages).

* cited by examiner

GARMENT HAVING EXTENSIBLE SLEEVES

CROSS-REFERENCE TO RELATED APPLICATIONS

This application is a U.S. National Phase Application of International Application No. PCT/US2014/052918, filed Aug. 27, 2014, which claims priority to U.S. Provisional Application No. 61/874,353, filed Sep. 5, 2013, each of which are hereby incorporated by reference in their entirety.

BACKGROUND OF THE INVENTION

Field of the Invention

The present invention relates to a garment, such as a jacket having extensible sleeves.

Background

Most garments are cut and sewn to provide a defined shape that is fixed. In many situations however, fixed shaped garments limit motion and hamper activities of the wearer. In work environments for example, a person may be required to perform any number of task that may lead to them stretching, reaching, bending, lunging, and any combination thereof. These types of motions may be limited by garments that restrict the worker's movement and keep them from effectively completing their duties. In particular, when reaching forward with both hands, the back portion of a jacket may become tight and the ends of the sleeves may pull up on the person's arms, thereby exposing their wrists and arms. This can be uncomfortable in cold work environments and unsafe in work environments where exposed skin may be injured. Workers in chemical labs, electrical workers and those in a shop or steel mill, for example, may want to ensure that their jacket or garment does not ride-up on their arms and create an unsafe condition.

SUMMARY OF THE INVENTION

The invention is directed to a garment having extensible sleeves. The garment of the present invention may be jacket, a coat, a long-sleeve shirt, coveralls and the like. The garment comprises an outer layer comprising a torso portion having two armholes, two sleeve portions, and an optional collar portion. The two sleeve portions comprise a gusset having two substantially linear sides connected to the sleeve and a curvilinear side coupled to the armhole. In an exemplary embodiment, the sleeves comprise a cuff and this cuff may comprise a thumbhole for maintaining the cuff over the thumb of a wearer. The garment, as described herein, may further comprise a flange attached to each of said two armholes. A flange provides a stored length of material tucked within the armhole and, in an exemplary embodiment, comprises one or more folded layers of material. A connector couples the two flanges and extends across the back portion of the garment. In an exemplary embodiment, a connector is an elastic band of material that allows the flanges to extend out from the armhole when a person is reaching forward, for example. When a person discontinues a motion that causes the sleeves to extend and the flanges to release the stored material, the connectors retract the flange, or stored material, back into the armhole portion of the garment. In this way, the jacket maintains an attractive appearance and good fit for the wearer.

The garment of the present invention may be any suitable type of garment including, but not limited to, a jacket, a long sleeve shirt, a coat, including a lab coat or welding coat, a suit having attached pants or shorts and the like. The garment may be constructed out of materials to provide the desired attributes for a selected type of activity. For example, a jacket for outdoor work may comprise a waterproof outer layer. A garment or outer layer of a garment may be constructed out of fireproof, arc resistant, and/or chemical resistant materials. A garment may have an inner layer and an inner lining, and these layers, along with the outer layer, may be attached by any conventional means such as quilting, for example. A garment may comprise a partial or full liner. For example, a liner may be configured over the torso portion of the garment, sleeves, flange or any combination thereof. The garment may have any number of pockets, a collar, a hood and the like. A garment may comprise a recloseable opening along the front or back portion of the torso for donning said garment. A garment may comprise a zipper along the front length of the torso portion for example. A garment may further comprise two pant legs, such as in coveralls, for example.

The garment comprises a flange attached to each of the armholes. A flange facing may be attached to the armhole by stitching for example. A flange is configured to extend into the armhole, or overlap the torso portion of the garment at least partially. In an exemplary embodiment, substantially the entire flange is configured within the armhole, or overlaps the torso portion of the garment. A connector may be configured to pull a flange back into an original configuration after extension. In other embodiments, a portion of the flange may extend out beyond an armhole opening when in an un-extended state.

A flange comprises at least one fold of material that enables the sleeve to extend. The fold of flange material within the armhole, or overlapping the torso portion, of the garment provides the stored length of material for sleeve extension. A sleeve may have a first length, or un-extended length, where the flange is not pulled out and an extended length where the flange is pulled out to allow the sleeve to extend. A sleeve may be configured to extend any suitable amount, such as about 1 cm or more, about 2.5 cm or more, about 4 cm or more, about 5 cm or more, about 7.5 cm or more, about 10 cm or more, and any range between and including the extension lengths provided. In one embodiment, a flange has two or more folds or pleats of flange material.

A flange may have any suitable shape and may have more stored length of material along the midpoint or bottom of the flange where more extension may be required. A flange may be rounded to match the contour of an armhole for example, or may have straight edges and angular corners. A flange may comprise any number of folds or connected portions of material. A flange may be made out of any suitable material, and may comprise any of the outer layer materials, as described herein. In addition, a flange may comprise a liner material and one or more inner layers. An inner layer is a layer of material between the outer layer and the liner and may be an insulation type of material, for example. A flange may be connected to the torso portion of the garment on one end and to a sleeve on the other end and provide a stored length of material between these two attachments. A connector is attached to the two flanges and provides a retracting force for pulling the flanges back into a stored length configuration, or within the armholes. A connector may be attached to a fold of the flange for example. One or more connectors may be attached to the flanges in any suitable location along the flange. In an exemplary embodiment, one or more connector straps are extend between the two flanges, or the left and right flanges. A connector strap has a width that is no more than one-quarter the strap length. The strap length is measured between the two attachment locations on the flanges in a non-extended sleeve state. In one embodiment, a connecter comprises a first elastic strap that is attached approximately midway vertically along each of the flanges, and a second elastic strap that is connected at the bottom portion of each of the flanges. A connector may be attached in a position to provide the easiest range of motion. A connector strap may be configured to extend substantially horizontally across the back of the torso portion, or may configured to extend at any suitable offset angle to horizontal. In addition, two or more straps may be configured to overlap. In still another embodiment, a sheet type connector is coupled to each of the flanges and may extend up and be attached to the flange about one-half the length of the flange, or more.

A gusset, as described herein, may comprise a portion of fabric with two substantially linear sides that are connected to a sleeve and a curvilinear side that is coupled to the armhole. A portion of a curvilinear sides of a gusset may be attached to the torso portion of the garment along the bottom of the armhole and a portion may be attached to a flange. Likewise, a portion of the linear sides of a gusset may be attached to a sleeve and a portion may be attached to a flange. A gusset may comprise any suitable type of material or materials as described herein. A gusset may comprise a material that is elastic, or has elastic recover to substantially return the material to an original shape after extension. A gusset may comprise a fabric that is elastic or predominantly elastic in one axis. A gusset may also comprise a cut within the area defined by the curvilinear sides and substantially linear sides, and this cut may be configured at a bias to the axis of elastic stretch. For example, a cut may be configured to be substantially parallel with one of the linear sides and the axis of elastic stretch may be substantially perpendicular to said linear side. A cut in this orientation will open up as the fabric is stretched in the axis of stretch. A cut may have any suitable length including, but not limited to, about 1 cm or more, about 2.5 cm or more, about 4 cm or more, about 5 cm or more, about 6 cm or more, about 7.5 cm or more and any range between and including the length values provided.

The two substantially linear sides may be configured to form an acute angle therebetween of about 60° to about 120°, or about 75° to about 105°, for example. The curvilinear side may be configured as an arc or series of arcs between the two intersection points with the substantially linear sides. The curvilinear side may be a portion of a circle or an oval. The curvilinear side may extend between the two substantially linear sides, and have a radius of curvature substantially equal to one-half the distance between the intersection of said two substantially linear sides and said curvilinear side. Put another way, the curvilinear side forms a half circle between the intersection with the substantially linear sides.

The garment, as described herein, may comprise a cuff at the extended end of each sleeve having a thumbhole. A user may insert their thumb into the thumbhole to keep the sleeve in a desire location while performing various tasks, or when putting on other garments, such as protective sleeves. A cuff with a thumbhole may more effectively protect a wearer, and particularly their wrists, from exposure to danger. The cuff and thumbhole allow a worker to maintain the garment, as described herein, in a desired location when reaching forward or when putting on other protective apparel, such as insulating sleeves. The thumbholes enable a wearer of the garment to engage the action back when performing tasks, as their thumb will pull on the sleeve to extend the flange.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
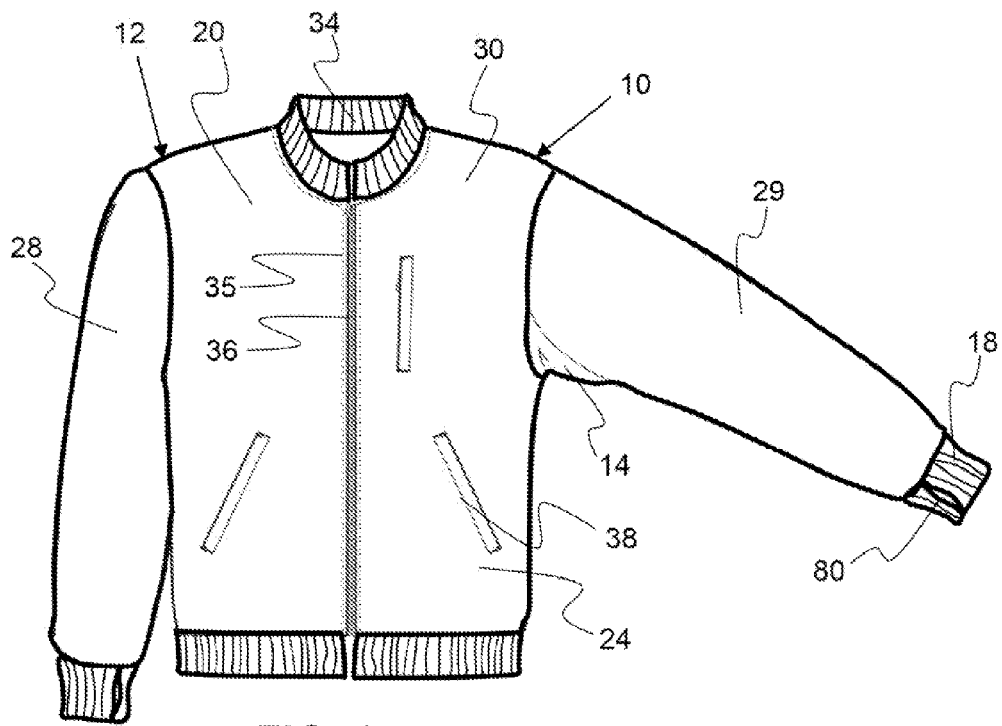

FIG. 1 shows a front view of an exemplary garment having extensible sleeves, as described herein.

Figure 2:
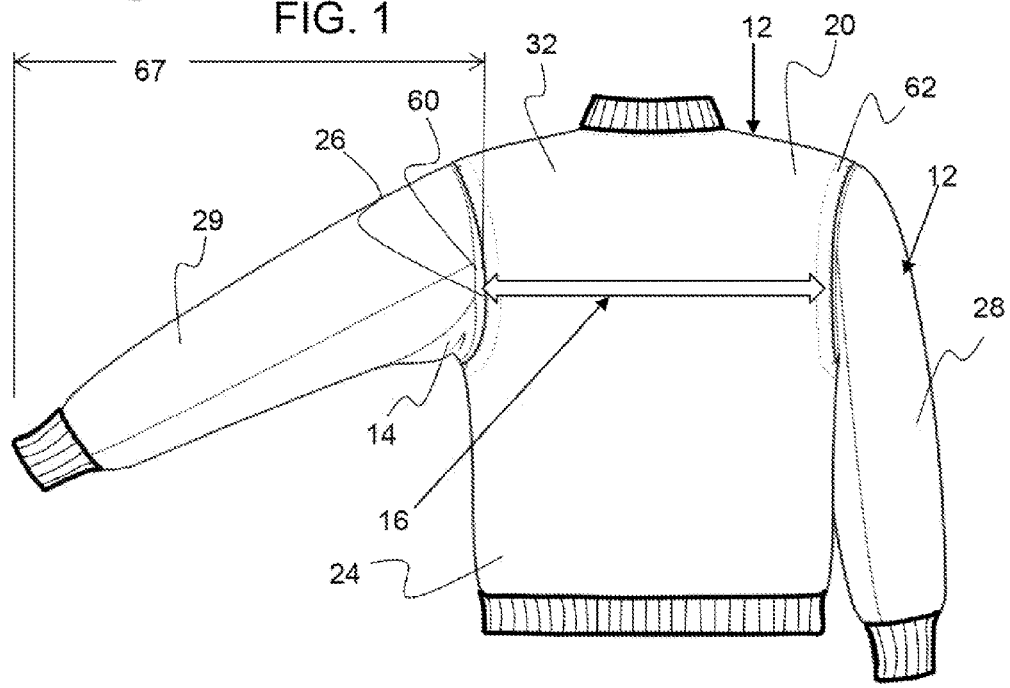

FIG. 2 shows a back view of an exemplary garment having extensible sleeves, as described herein.

Figure 3:
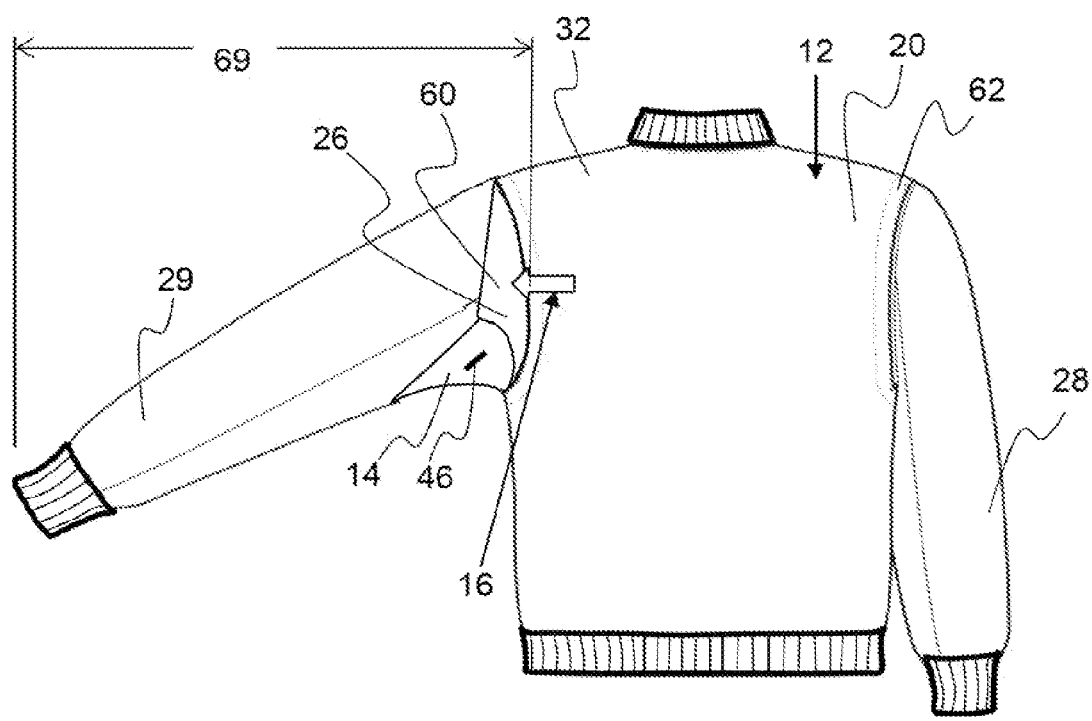

FIG. 3 shows a back view of an exemplary garment having the left sleeve extended and the left flange pulled out, as described herein.

Figure 4:
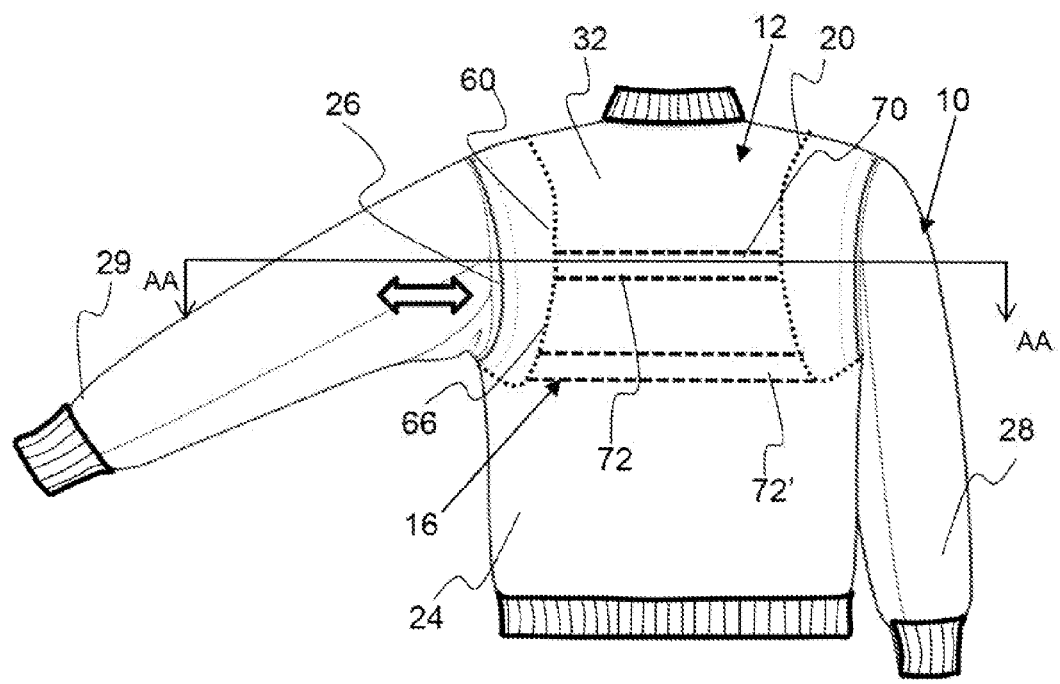

FIG. 4 shows a back view of an exemplary jacket having an action back, as described herein.

Figure 5:
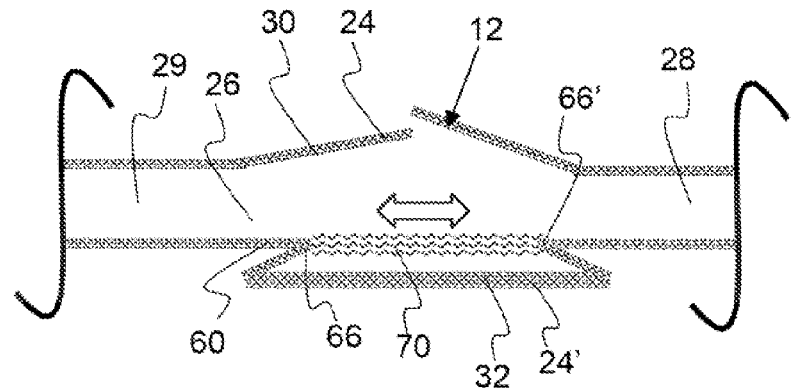

FIG. 5 shows a cross-sectional view of the jacket shown in FIG. 4 along line AA.

Figure 6:
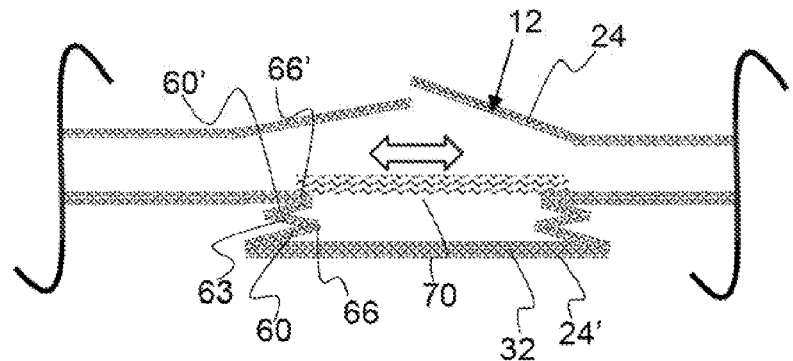

FIG. 6 shows cross-sectional view of an exemplary jacket having a double flange configuration, as described herein.

Figure 7:
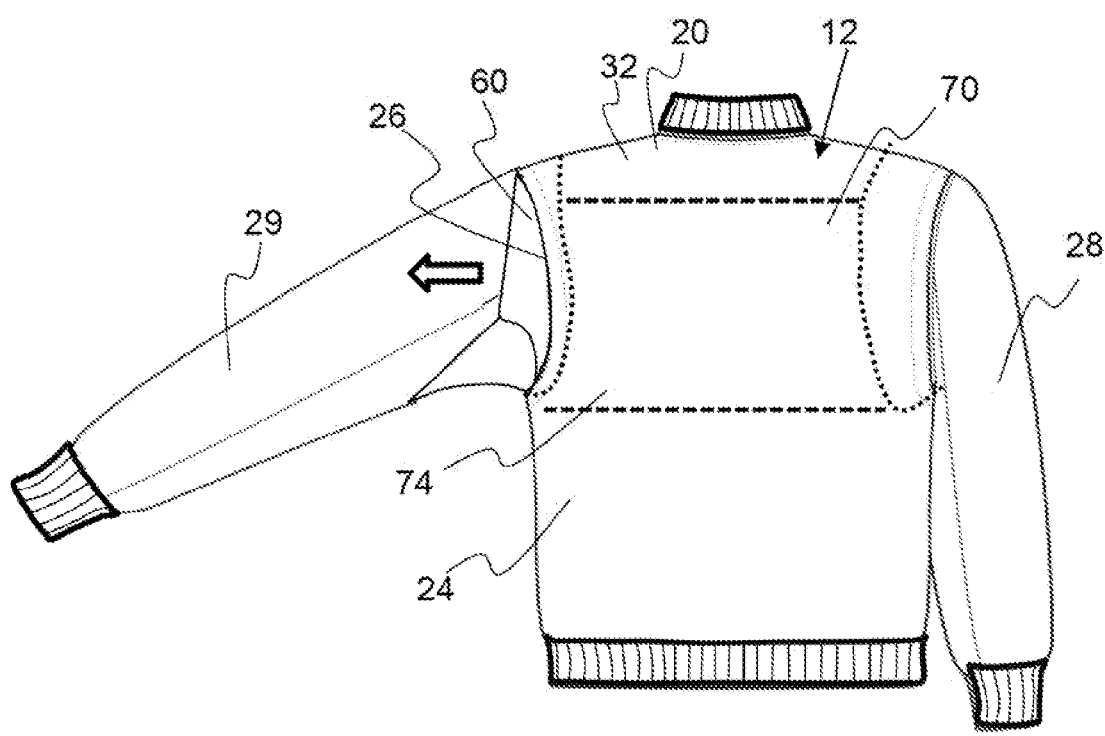

FIG. 7 shows a back view of an exemplary jacket having a sheet type connector, as described herein.

Figures 8A, 8B:
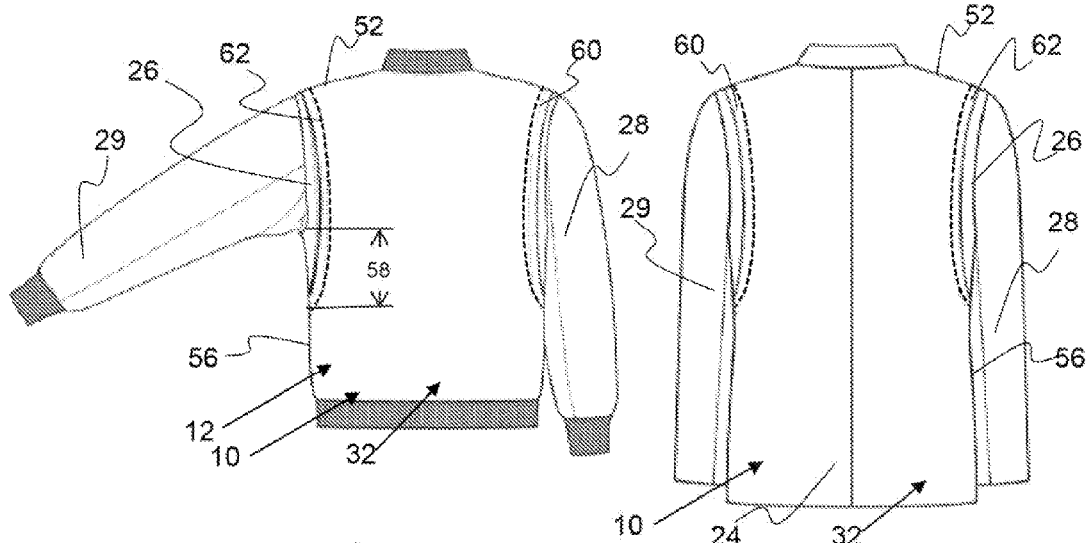

FIGS. 8A and 8B show back views of exemplary garments having rounded and elongated flanges that extend beyond the bottom of the armhole where they are attached to a side seam.

Figures 9A, 9B:
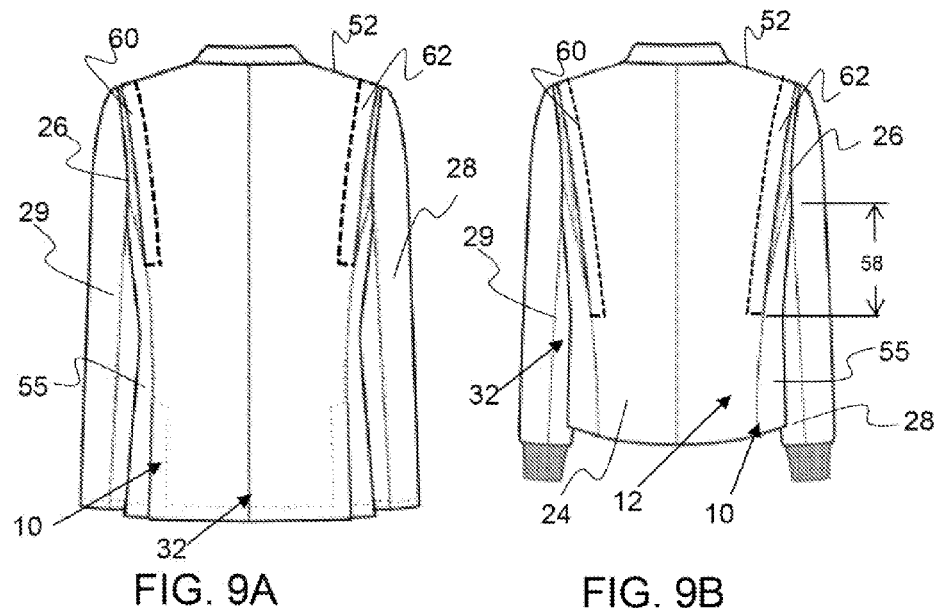

FIGS. 9A and 9B show back views of exemplary garments having straight and elongated flanges that extend beyond the bottom of the armhole where they are attached to a side panel.

Figures 10A, 10B:
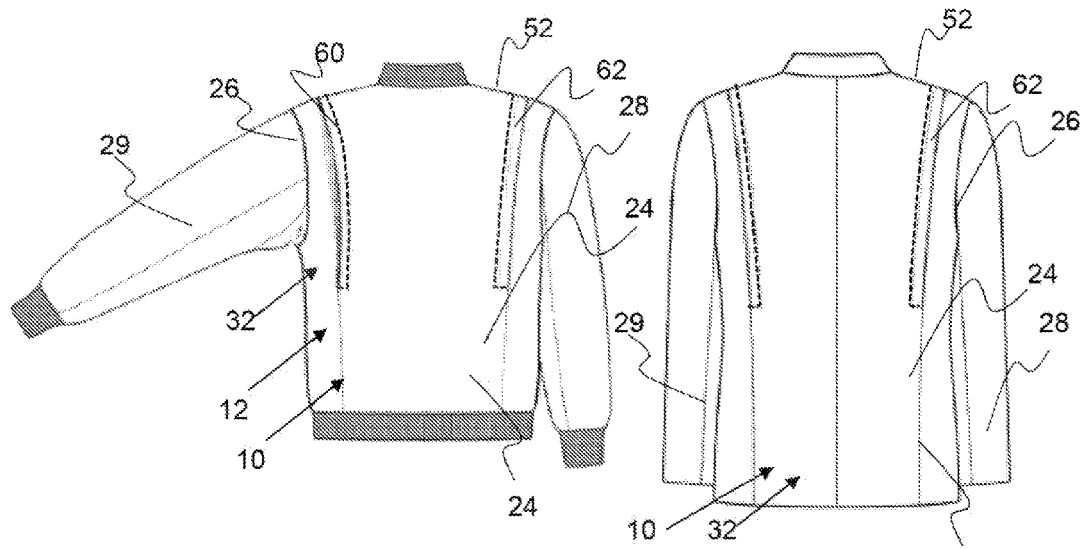

FIGS. 10A and 10B show back views of exemplary garments having flanges attached to the torso portion of the garment.

Figure 11:
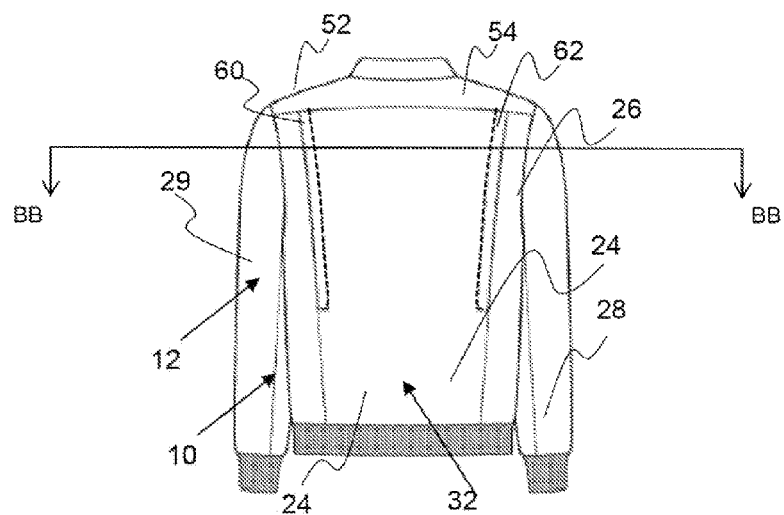

FIG. 11 shows a back view of an exemplary garment having flanges attached to and extending down from a yoke portion of the garment.

Figure 12:
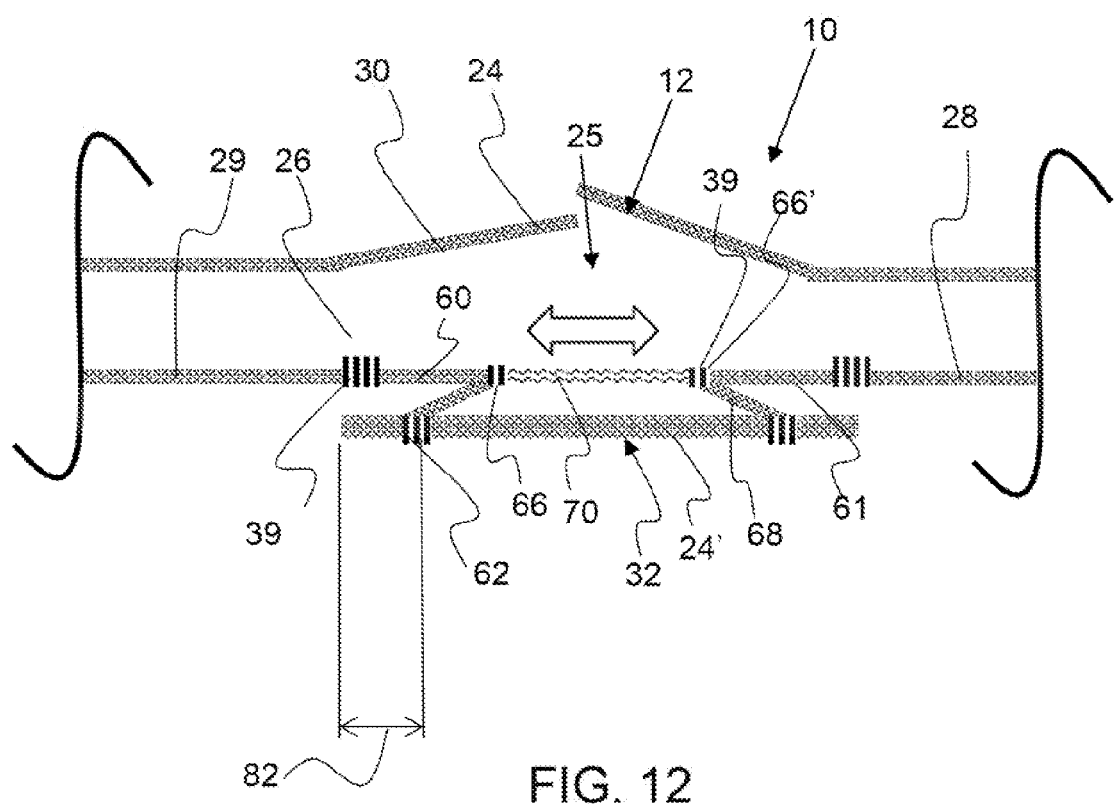

FIG. 12 shows a cross-sectional view of the jacket shown in FIG. 11 along line BB.

Figure 13:
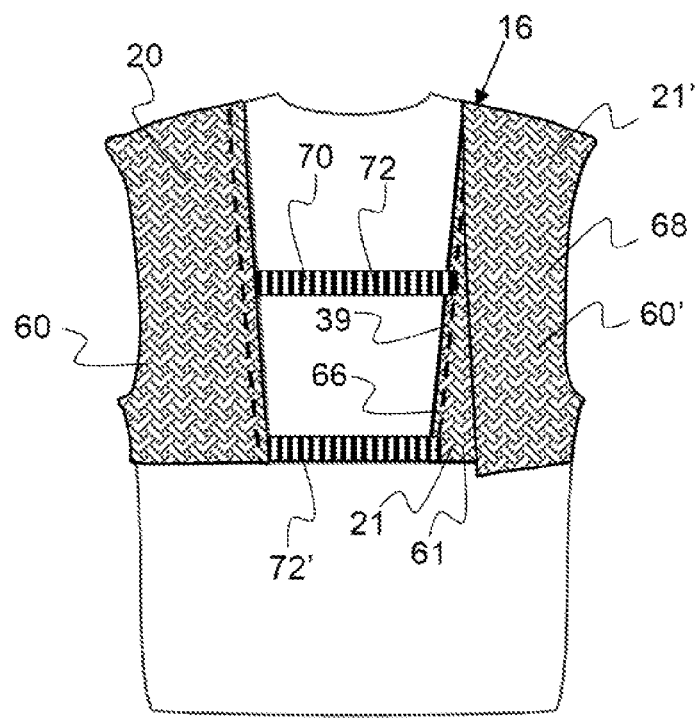

FIG. 13 shows a back view of an exemplary action back having two strap type connectors, as described herein.

Figure 14:
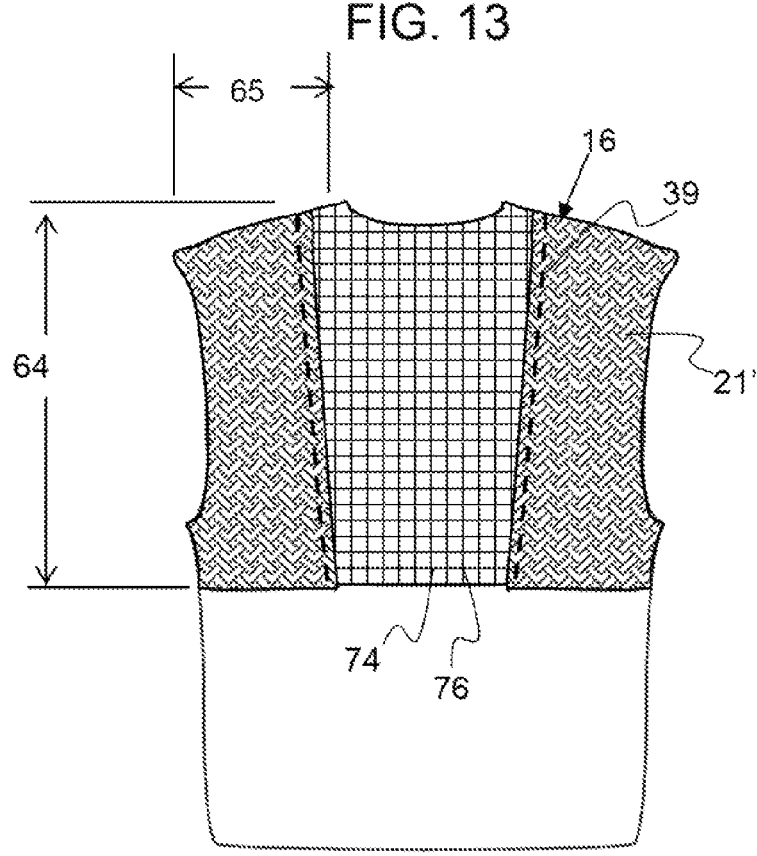

FIG. 14 shows a back view of an exemplary action back having a sheet type connector, as described herein.

Figure 15:
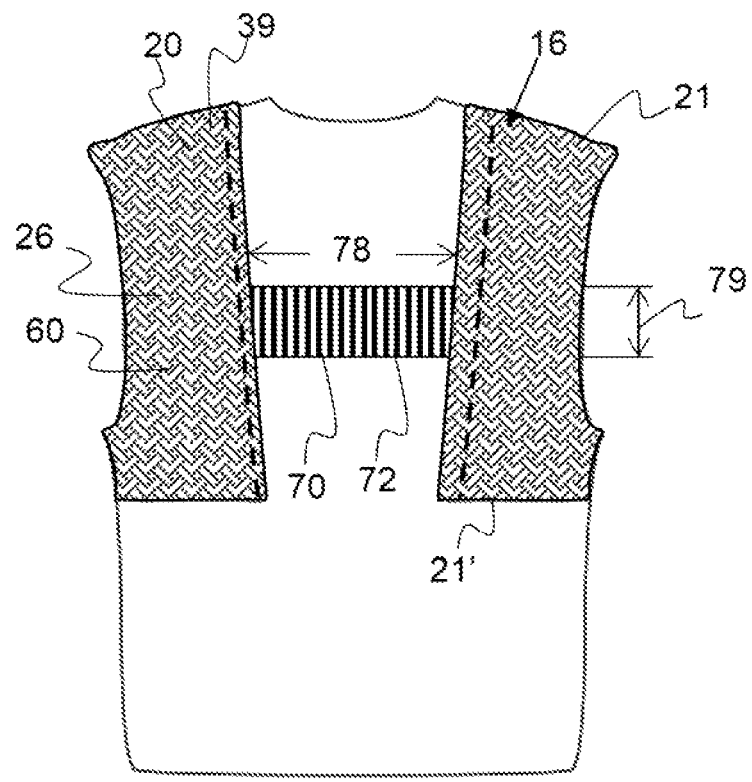

FIG. 15 shows a back view of an exemplary action back having a single strap type connector, as described herein.

Figure 16:
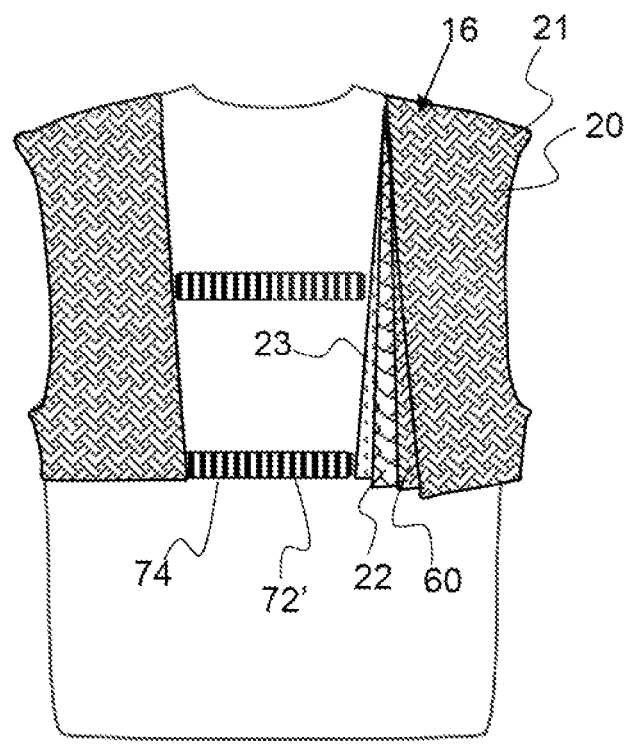

FIG. 16 shows a back view of an exemplary action back having a flange with an outer layer of material, a liner and an inner layer of material, as described herein.

Figures 17, 18:
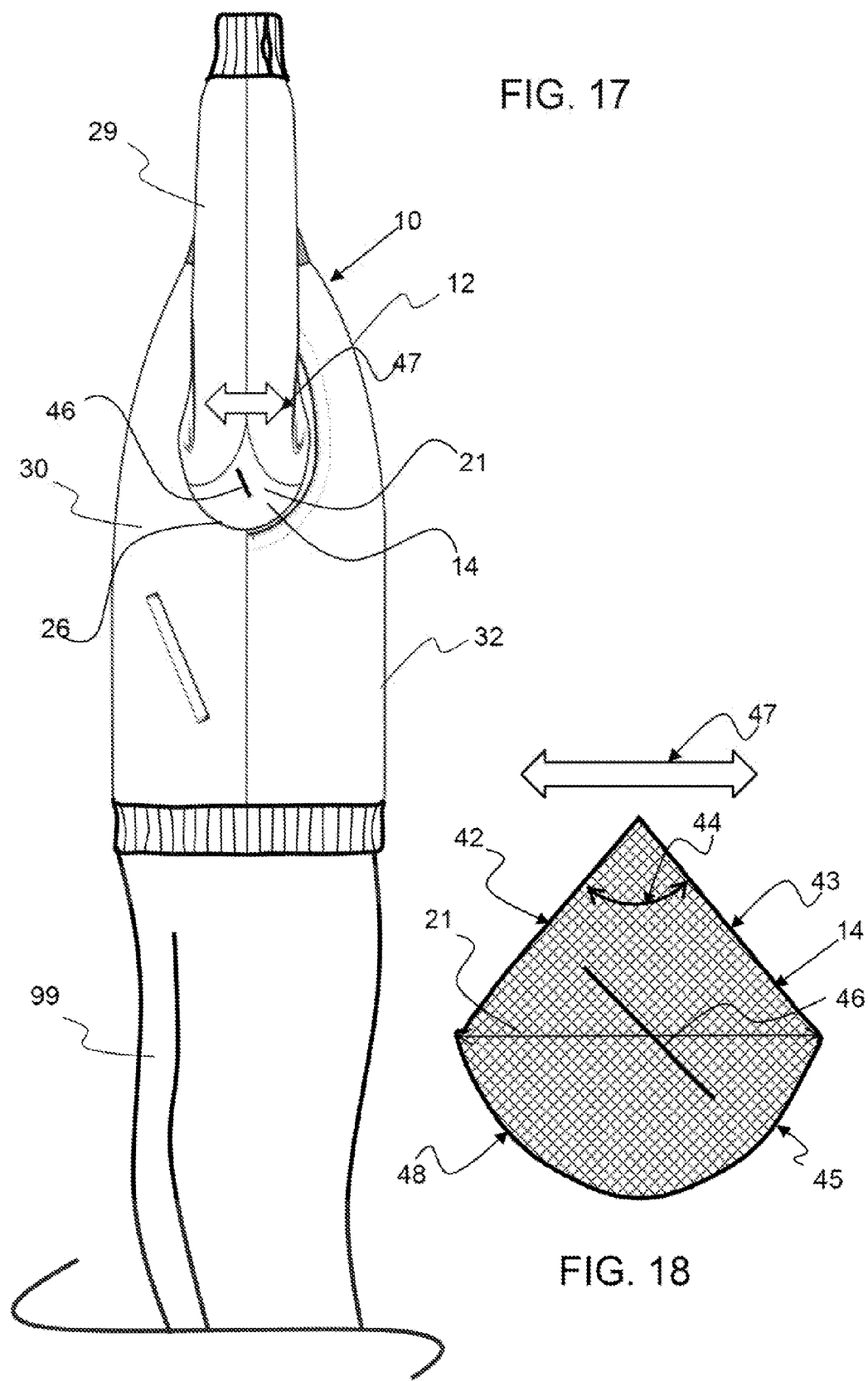

FIG. 17 shows a left side view of an exemplary garment having a gusset, as described herein.

FIG. 18 shows top-down view of an exemplary gusset having a cut on the bias to the axis of stretch, as described herein.

Figures 19A, 19B, 19C:
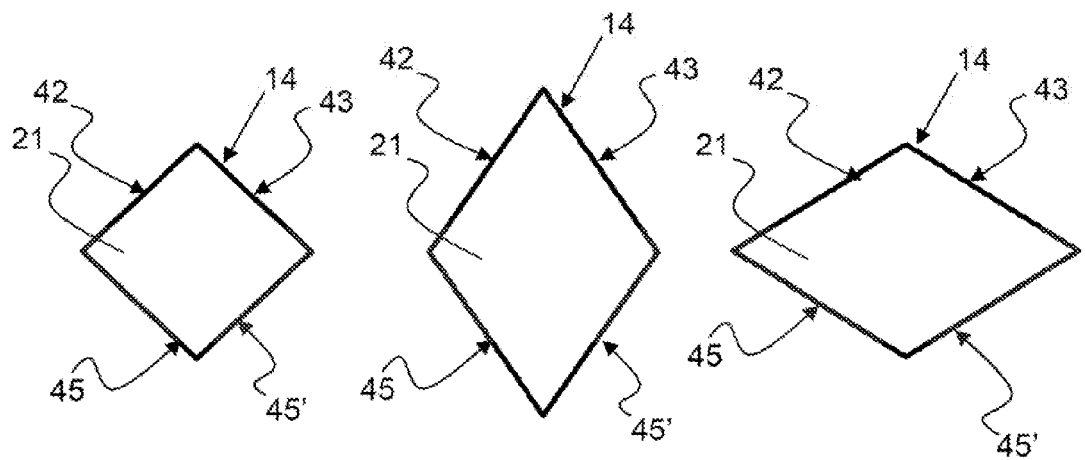

FIGS. 19A, 19B and 19C show exemplary gussets, as described herein.

Figures 20A, 20C:
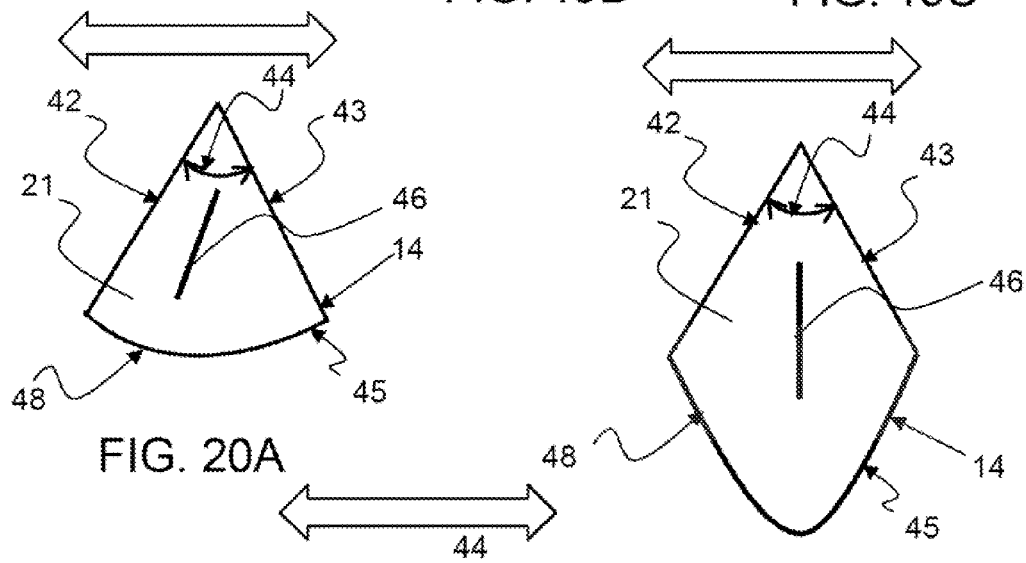
Figure 20B:
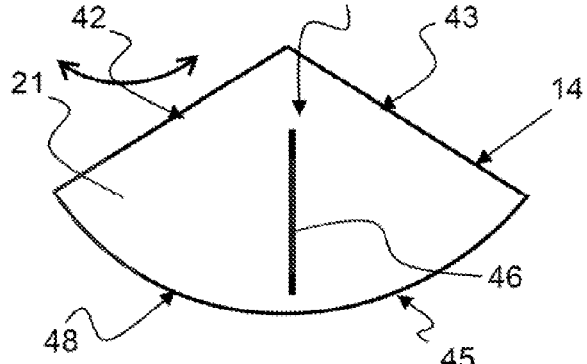

FIGS. 20A, 20B and 20C show exemplary gussets, as described herein.

Figure 21:
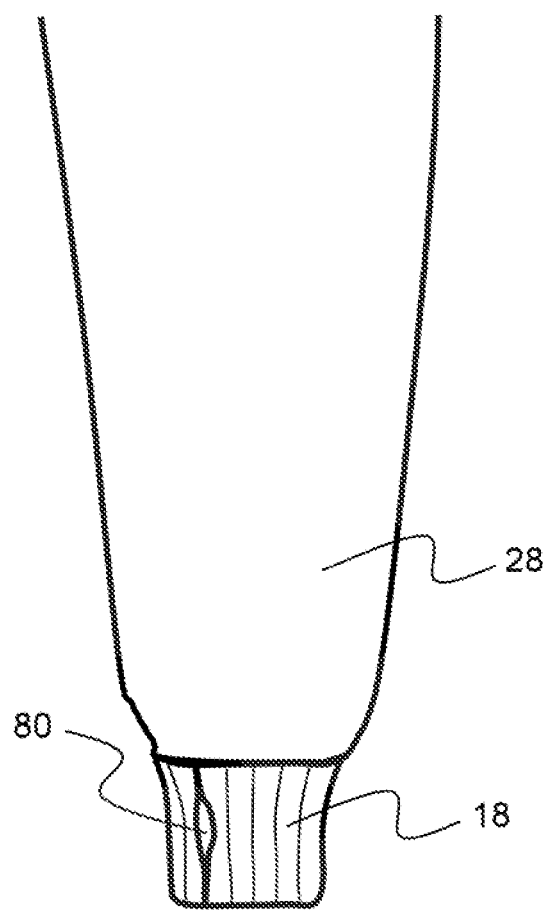

FIG. 21 shows side view of an exemplary sleeve having a cuff and thumbhole therein.

Figure 22:
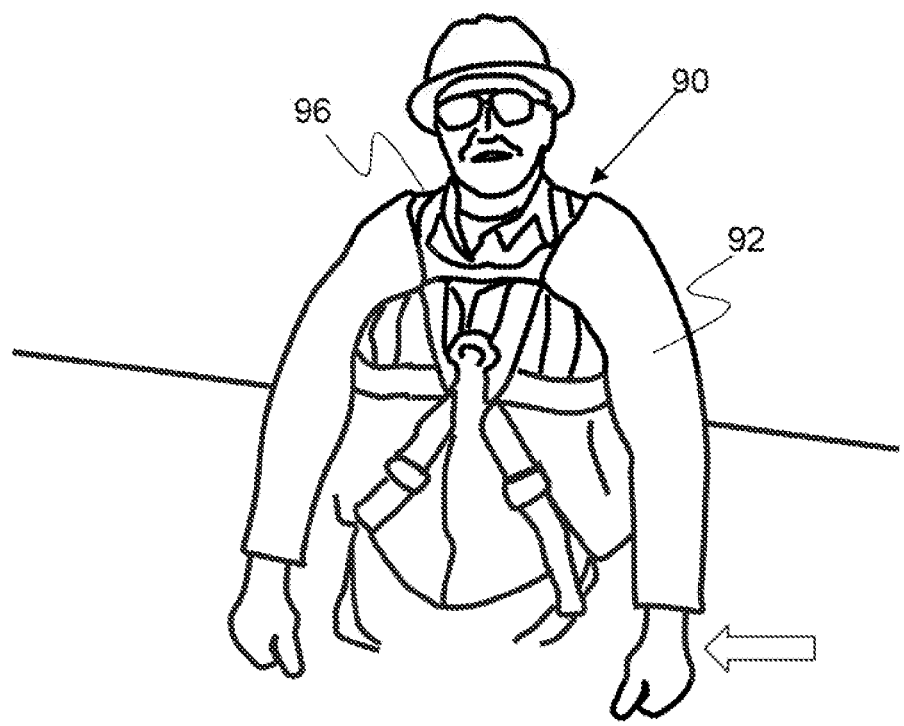

FIG. 22 shows a front view of a worker donning a standard garment and insulating sleeves there over.

Figure 23:
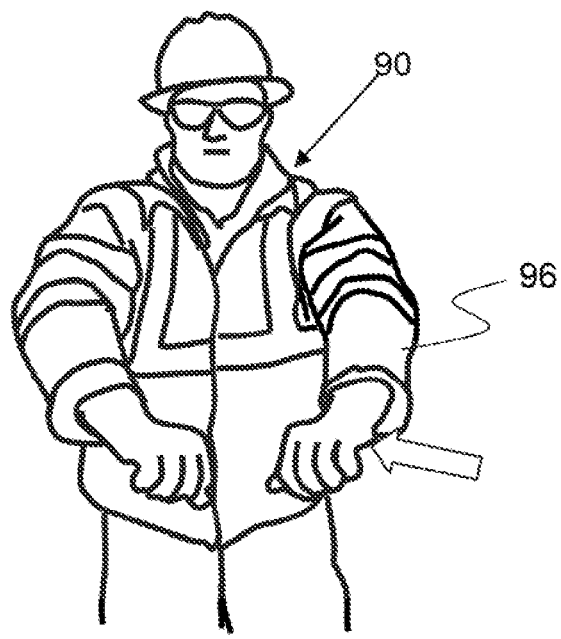

FIG. 23 shows a front view of a worker donning a standard garment and reaching forward with both hands.

Figure 24:
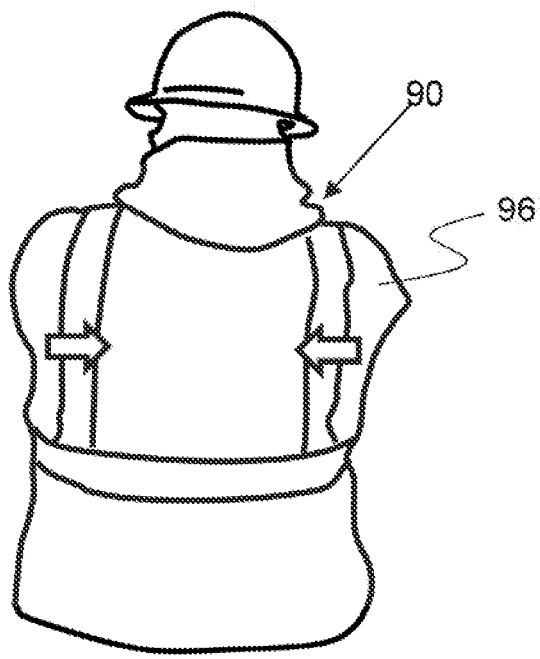

FIG. 24 shows a back view of a worker donning a standard garment and reaching forward with both hands.

Figure 25:
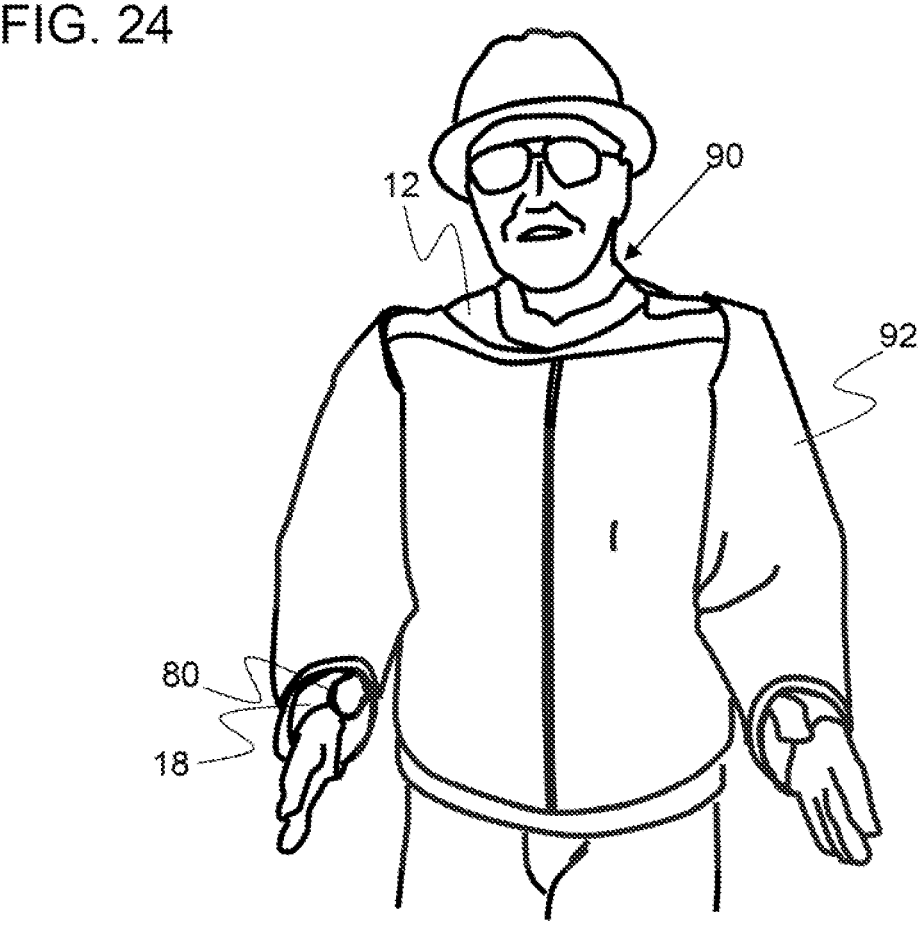

FIG. 25 shows a front view of a worker donning an exemplary garment, as described herein, and insulating sleeves there over.

Figure 26:
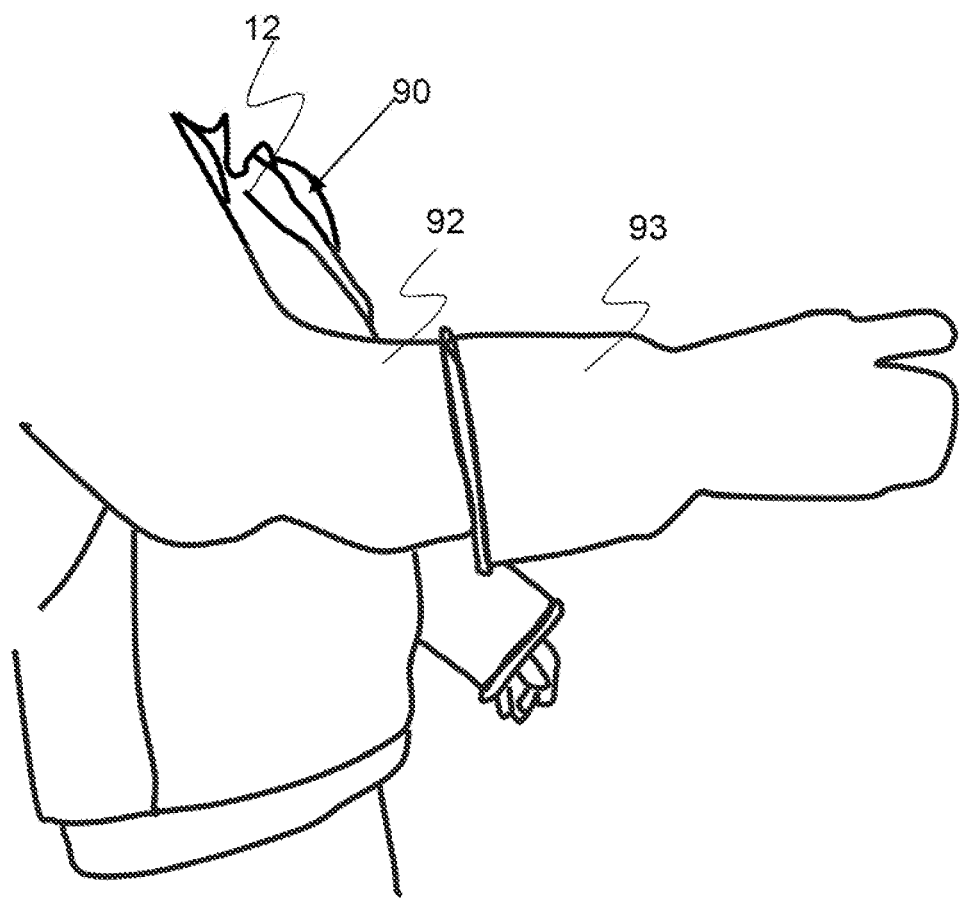

FIG. 26 shows a front view of a worker donning an exemplary garment, as described herein, and insulating sleeves there over.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an exemplary garment 10 has extensible sleeves 28, 29 with cuffs 18, and thumbholes 80 configured in the cuff. The front side 30 of the jacket 12 has a plurality of pockets 38, a collar 34 and a zipper 36 type recloseable opening 35. The jacket 12 also has a gusset 14 configured between the sleeve and the torso portion 24. A gusset may be at least partially attached to an armhole of a torso portion. The outer layer 20 of the jacket may comprise any suitable material including, but not limited to waterproof, fireproof, arc resistant, chemical resistant, and the like.

As shown in FIG. 2, the back side 32 of an exemplary jacket 12 has an action back 16. An action back has a flange 60 coupled to each of the armholes 26 and a connector (not shown) between the flanges. The action back allows the sleeves to extend and contract as indicated by the double arrow across the back torso portion 24. The non-extended length 67 of the left sleeve 29 is shown in FIG. 2. The flange facing 62 is attached to the armhole by stitching as shown.

A flange facing is where a flange is attached to the torso portion of a garment, including, but not limited to an armhole, yoke, shoulder portion, side panel, or side seam.

As shown in FIG. 3, an exemplary jacket 12 has the left sleeve 29 extended and the left flange 60 pulled out. The extended length of the sleeve 69 is shown in FIG. 3. The flange, comprising a stored length of material tucked into the armhole 26, is extended out as indicated by the large arrow. A gusset 14 is shown having a cut 46 within the area defined by the gusset.

As shown in FIG. 4, an exemplary jacket 12 has an action back 16 comprising two strap 72, 72' type connectors 70, indicated by broken lines. The first strap connector 72 is configured approximately midway up the flange 60 and the second strap connector 72' is configured along the bottom portion of the flange, as shown. The flange 60 is configured within the armhole 26, or overlapping with the torso portion 24 of the garment 10. The dashed line 66 indicates the fold line of the flange 60. The flange is tucked away under the outer layer 20 of the garment.

As shown in FIG. 5, the jacket 12 shown in FIG. 4 has a flange 60 comprising a folded layer of material tucked back inside of the armhole 26. The connector 70 is attached to the fold 66 and 66' of the two flanges. This view clearly shows show the folded flange material provides stored length for extending the sleeves 28, 29. It is to be understood that the term folded means that the material is configured with a fold, or double over or overlapping, but may comprise two or more pieces of discrete fabric that are coupled together, such as along the fold line. The connector 70 shown in FIG. 5 is elastic and can stretch as indicated by the double arrow. After the tension exerted on the sleeves is removed, the connector is configured to retract the flange back to substantially an original orientation.

As shown in FIG. 6, an exemplary jacket 12 has a double flange 63 configuration having two flanges 60 and 60'. The double flange has two folds 66, 66' of flange material. The connector is coupled to the second fold 66'. Any number of folds or pleats may be configured in a flange.

As shown in FIG. 7, an exemplary jacket 12 has a sheet type 74 connector 70 as indicated by the dashed lines running horizontally across the back torso portion 24. The sheet type connector may be an elastic fabric or other material, such as an elastic mesh. The left sleeve 29 is extended and the flange 60 has been stretched out as indicated by the vertical dashed line. Comparison of the left and right flange outlines show how the left flange is moved out from with the torso portion of the garment.

As shown in FIGS. 8A and 8B, exemplary garments 10 have rounded and elongated flanges 60 that extend beyond the bottom of the armhole 26 where they are attached to a side seam 56. A side seam is a seam that attaches a front torso portion to a back torso portion. An elongated flange is a flange that extends down below the bottom of an armhole, as shown. An elongated flange may have any suitable elongated flange distance 58 as shown in FIG. 8A. A portion of the flange facing is attached to the armhole and a portion is attached to the side seam.

As shown in FIGS. 9A and 9B, exemplary garments 10 having straight and elongated flanges 60 that extend beyond the bottom of the armhole where they are attached to a side panel 55. A side panel is a piece of fabric attached between a front torso portion of fabric and a back portion of torso fabric. A portion of the flange or the flange facing 62 is attached to the armhole and a portion is attached to a side panel.

As shown in FIGS. 10A and 10B, exemplary garments have flanges 60 attached to the torso portion 24 of the garment 10. The flange facing 62 is attached, such as by stitching, to the back side 32 torso portion 24. The flange may extend from this back torso portion attachment location and attach to a sleeve 28, 29. The flanges are attached to and extend down from a shoulder portion 52 of the garment 10. A shoulder portion may comprise a seam extending between the top of a front and back torso portion and generally extending along the shoulder. A shoulder portion 52 may extend from a neck hole opening or a collar to an armhole. When a flange is attached to a torso portion as shown in FIGS. 10A and 10B, the entire flange may remain within the inside of the garment and not extend outside of the armhole, even when the sleeve is extended. The sleeves may extend into the interior of the garment where they are coupled with the flanges.

As shown in FIG. 11, an exemplary garment 10 has flanges 60 attached to and extending down from a yoke portion 54 of the garment. A yoke is a portion of a garment that extends down from the shoulder portion where a back torso portion of fabric is attached thereto.

Any combination of flange attachment configurations may be employed in the inventive garment described herein. For example, a portion of a flange, or flange back portion, may be attached to a back torso portion, armhole, side panel and/or side seam. The configuration of the attachment and geometry of the flange itself may be selected to provide a desired amount of sleeve extension. Likewise a flange may be at least partially attached to a sleeve and a gusset.

As shown in FIG. 12, the exemplary jacket 12 shown in FIG. 11 has a flange that is attached to back torso portion 24. The flange facing is attached to the torso portion 24 at an inset distance 82. The inset distance may be any suitable distance including, but not limited to, about 1 cm or more, about 2.5 cm or more, about 5 cm or more, about 7.5 cm or more, about 10 cm or more and any range between and including the inset distance provided. The flange 60 comprises a flange back portion 68 of material that is attached to the torso portion of the garment and a flange sleeve portion 61 that is stitched to, or otherwise attached at least partially to a sleeve 28. A flange back portion 68 may be attached at least partially to an armhole, side seam, side panel, gusset, shoulder portion or yoke as described herein and retains the flange to the garment 10. The flange sleeve portion 61 is attached at least partially to a sleeve and may have a portion attached to the gusset. The flange back portion 68 and flange sleeve portion 61 may be two separate pieces of material that are stitched together 39 to form a fold, or overlap of material. A connector may be attached to the fold 66 portion of the flange 60. As shown in FIG. 12, the flange 60 is attached to the sleeves 28, 29 by a stitch 39. The entire flange 60 is configured within the inside 25 of the garment 10, wherein the flange is tucked completely within the back torso portion of the garment 10. It is to be understood that additional folds of material may be configured between a flange back portion 68 and flange sleeve portion 61, as shown in FIG. 6.

As shown in FIG. 13, an exemplary action back 16 has two strap 72, 72' type connectors 70. The flange 60 on the left side of the action back has been stitched together. The flange 60' on the right side has the connectors stitched to a first layer of flange fabric 21, or the flange sleeve portion 61, and the flange back portion 68, or second layer of flange fabric 21', is configured to be stitched to the first layer of flange fabric 21 along stitch line 39 to create a fold 66. A flange sleeve portion 61 may be attached along an armhole (not shown) on a first side, and attached to a fold along a second side, as shown. Flange fabric 21 may comprise an outer layer of fabric 20 as it will be exposed when the flange is pulled out from the armhole.

As shown in FIG. 14, an exemplary action back 16 has a sheet type connector 74 that extends substantially the entire length 64 of the flange. The sheet type connector is an elastic mesh material 76. The width of the flange 65 is also shown. The connector is attached to the flange by a stitch 39 but could be attached in any suitable way including, but not limited to, adhesive, ultrasonic welding, sewing and the like.

As shown in FIG. 15, an exemplary action back 16 has a single strap type connector 72 that is configured substantially midway vertically up the flange 60. The width of the strap type connector 79 and length 78 are shown.

As shown in FIG. 16, an exemplary action back 16 has a flange 60 with an outer layer of material 20, a liner 23 and an inner layer 22 of material. The connector may be attached to all four layers of this material. The various layers of garment material may be attached or coupled together by quilting or any other suitable means. A flange may be made out of the same materials as the rest of the garment, or may comprise some portion of the layers of fabric used in the garment. In an exemplary embodiment, a flange comprises an outer layer of fabric as the flange may be pulled out from the armhole and be exposed.

As shown in FIG. 17, an exemplary garment 10 has a gusset 14 configured between the sleeve 29 and the armhole 26. The gusset is made from an elastic stretch material, or fabric, having an axis of stretch 47 as indicated by the double arrow above the gusset. The gusset has a cut 46 that has a length axis that is at a bias to the stretch direction of the gusset fabric. The exemplary garment 10 shown in FIG. 17 also comprises two attached pant legs 99. This garment 10 may be a work suit or coveralls, as described herein.

As shown in FIG. 18, an exemplary gusset 14 has two substantially linear sides 42 and 43, and a curvilinear side 48. The two substantially linear sides form an acute angle 44 therebetween. The curvilinear side shown is substantially a half circle having a radius of curvature that is approximately one-half the distance between the intersections of the curvilinear side and the two substantially linear sides, or the distance indicated by the double arrowed line extending across the gusset. A cut 46 is configured on a bias to the axis of stretch. The axis of stretch is indicated by the double arrow above the gusset. The cut is configured substantially parallel to the linear side 43 of the gusset. A gusset may be configured out of an elastic fabric. The two substantially linear sides are attached to the sleeve of a garment and at least a portion of the curvilinear side is attached, or couple to an armhole. A curvilinear side may be attached to a flange, at least partially.

As shown in FIGS. 19A, 19B and 19C exemplary gussets 14 comprise first and second substantially linear sides 42 and 43 that are configured to attach to a sleeve and a two substantially linear sides configured for attachment to the armhole, flange or torso portion of the garment. The retaining sides 45, 45' may be attached to any suitable portion of the garment. A portion of one of retaining sides 45, 45' may be attached to an armhole. For example, in FIG. 19A, retaining side 45 may be attached to an armhole, and retaining side 45' may be attached to a flange. A portion of a retaining side may be attached to a torso portion such as to the inside of the torso portion, or tucked inside of an armhole.

As shown in FIGS. 20A, 20B and 20C exemplary gussets 14 have two substantially linear sides 42 and 43 and a curvilinear side 48 extending therebetween. The curvilinear side may attach to an armhole, flange or torso portion of the garment as described for FIGS. 19A, 19B and 19C. A variety of cuts 46 are shown in different orientation in FIGS. 19A-19C. All of the cuts are on a bias to the stretch axis of the gusset fabric as indicated by the large double arrow above the gussets.

As shown in FIG. 21, an exemplary sleeve 28 has a cuff 18 and thumbhole 80 therein. The action back may be more effectively implemented when a wearer extends there thumb through a thumbhole, whereby any stretching motion will cause tension of the sleeve and stretch or pull out a flange.

As shown in FIG. 22, a worker 90 is donning a standard garment 96 and insulating sleeves 92 there over. The prior-art garment has shortened on the worker's arms leaving his wrists exposed as indicated by the large arrow.

As shown in FIG. 23, a worker 90 is donning a standard garment 96 and is reaching forward with both hands. This motion has exposed his wrists as the garment has pulled up on his arms.

As shown in FIG. 24, a worker 90 is donning a standard garment 96 and is reaching forward with both hands. This motion has created tension along the back side of the jacket.

As shown in FIG. 25, a worker 90 is donning an exemplary jacket 12 and insulating sleeves 92 there over. The worker has placed his thumbs through the thumbholes 80 in the cuff 18 of the jacket 12. This action, along with the action back (not shown), provide the worker with a comfortable and safe working garment.

As shown in FIG. 26, a worker 90 is donning an exemplary jacket 12 and insulating sleeves 92 there over. The worker shown in FIG. 18 has now place an insulated glove 93 over the insulating sleeve 92. The exemplary jacket 12 remains pulled down over the workers thumb in this configuration providing for a more comfortable and safe condition.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A garment, comprising:
    an outer shell, comprising:
        a torso portion comprising two armholes;
        two sleeve portions; and
        an optional collar portion;
        wherein each of said two sleeve portions comprises a gusset and a cuff; and
        wherein said gusset comprises a portion of a fabric with two linear sides and a curvilinear side;
        wherein each of said two linear sides are connected to said sleeve; and
        wherein said curvilinear side is attached to said armhole;
    an action back, comprising:
        at least one flange attached to each of said two sleeve portions;
        at least one connector coupled to and extending between each of said at least one flange;
    wherein said at least one connector comprises a first elastic strap and a second elastic strap;
    wherein said first elastic strap is configured about midway vertically along each of said flanges; and
    wherein said second elastic strap is connected at the bottom portion of each of said flanges.

2. The garment of claim 1, further comprising:
at least one liner.

3. The garment of claim 1,
wherein said action back further comprises a flange facing attached to each of said armholes.

4. The garment of claim 1,
wherein said action back further comprises a second flange attached to each of said two armholes.

5. The garment of claim 4,
wherein said action back further comprises a flange facing attached to each of said armholes.

6. The garment of claim 1,
wherein said at least one flange comprises at least one fold in a flange material.

7. The garment of claim 6,
wherein said at least one fold is configured to be pulled inside of said armhole by said at least one connector.

8. The garment of claim 7,
wherein the entire flange is configured to be pulled inside of said armhole by said at least one connector.

9. The garment of claim 1,
wherein the flange is a portion of fabric configured to have stored length for the sleeve, whereby the sleeve may be extended from the torso portion of said garment.

10. The garment of claim 1,
wherein the flange comprises an outer layer of material and a liner.

11. The garment of claim 1,
wherein said at least one connector comprises a sheet type connector.

12. The garment of claim 1,
wherein said at least one connector comprises a mesh material at least partially connecting each of said flanges.

13. The garment of claim 1,
wherein each of said two linear sides form an acute angle therebetween of about 60° to about 120°.

14. The garment of claim 1,
wherein said curvilinear side comprises an arc.

15. The garment of claim 1,
wherein said curvilinear side extends between said two linear sides, and has a radius of curvature equal to one half the distance between the intersections of said two linear sides and said curvilinear side.

16. The garment of claim 1,
wherein said fabric used for said gusset comprises a linear cut configured within an area defined by said two linear sides and said curvilinear side, wherein said cut has a length axis that is parallel with one of said linear sides.

17. The garment of claim 1,
wherein said outer shell further comprises two pant legs.

* * * * *